Abernethy & White.
Animal Shears.

N°42,263. Patented Apr. 12, 1864.

Witnesses:
William Cotter
Edward J. Hubbard

Inventors:
John Abernethy
William H. White

UNITED STATES PATENT OFFICE.

JOHN ABERNETHY AND WILLIAM H. WHITE, OF WOODBURY, CONNECTICUT.

IMPROVEMENT IN THE MANUFACTURE OF SHEARS.

Specification forming part of Letters Patent No. 42,263, dated April 12, 1864.

*To all whom it may concern:*

Be it known that we, JOHN ABERNETHY and WILLIAM H. WHITE, of Woodbury, Litchfield county, in the State of Connecticut, have invented a new and improved manner or way of making shears—or in other words, a new and useful improvement in the art of manufacturing shears; and I do hereby declare that the following, taken in connection with the drawings, is a full, clear, and exact description thereof.

Figure 1:
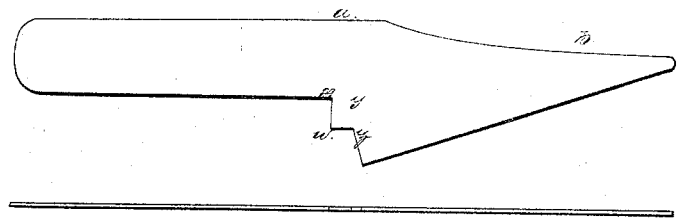
Figure 2:
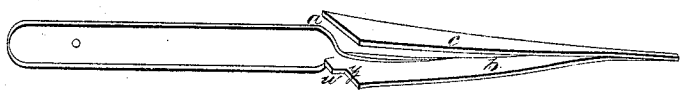
Figure 3:
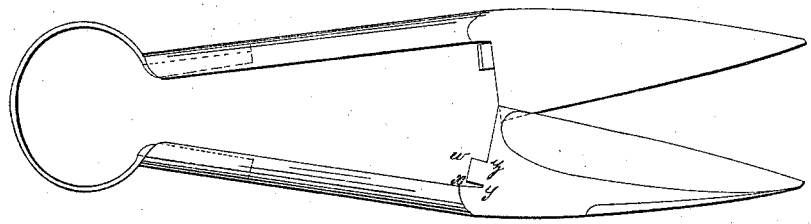
Figure 4:
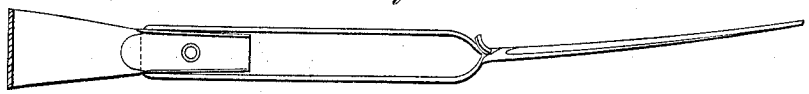

In the drawings, Figure 1 is a plan and elevation of the blank from which one of the blades and shanks of the shears is formed. Fig. 2 is a perspective view of one of the shanks and blades with the layer of steel which is to form the cutting-edge partially welded on. Fig. 3 is a plan of the finished shears, and Fig. 4 is a longitudinal section through the same.

Shears at the present time are usually composed of two blades, two shanks, and a bow, forged from one piece by hammers and swages, with steel cutting-edges welded on, and are costly and not so useful as they should be owing to the want of a steel bow, giving that quick recoil to the blades which is so important in the action of shearing; the iron bow, also, after short use, loses what little elasticity it originally possessed. We say usually composed, &c., but shears are not always so made, as we have recently been manufacturing them as described in the patent of William H. White, and have discovered that although such shears are preferable to the old-fashioned ones they are still imperfect, owing to the fact that the shanks are made of malleable cast-iron. It therefore became desirable to produce a shears as cheap and quick-working as those shears, and more lasting and even in quality. We have succeeded in discovering how to produce such a shears, and now make a shears as follows—viz: We first procure plates of wrought-iron of proper thickness, and by means of a punch and die cut out therefrom plates or blanks having substantially the form shown in Fig. 1, and suitable for a shank and blade. These blanks are then, by means of swages or dies, struck up nearly into the form shown in Fig. 2, bending that part of the blank which constitutes the shank into a trough or half-tube. That part of the blank from $a$ to $b$ is then, by blows of a hammer or swage, beaten down upon the blade, as shown in Fig. 2, thus thickening the back of the blade and making a strong connection between the shank and blade. A piece of steel, $c$, Fig. 2, is then welded fast to the blade. The shanks are either punched or drilled before or after they are made into a trough for the reception of the rivets by which the bow is attached, and, after the steel is welded on, the blades are ground into shape. A bow of steel like that shown in the drawings is then riveted into both shanks and the shears is completed. The little parallelogram of metal $w\,x\,y\,z$ is formed on the blank for the purpose of making a guard therefrom, and the guard is made by slitting the blank with a shears or cold-chisel from $x$ to $y$, and then bending the projecting piece so that in the finished shears one piece projects upward and the other downward. (See Fig. 3.) When the shears are used, these guards strike one against the other and prevent them from closing too far. These shears, when made, are the same as those described in White's patent, in so far as they have steel bows with concave shanks riveted thereto, and are composed of five pieces, and as a completed article are the same as White's. We, therefore, lay no claim to the article; but

We claim—

1. The improvement in the art or the manner of making the shears, by which improvement the cost is reduced and a better article furnished to the public.

2. The manner of making shears, substantially as herein described—that is to say, by first forming a blank by punching; by, secondly, shaping that blank by swaging and hammering into a form, substantialy as shown in the drawings, and, lastly, by uniting t o shanks and blades by a steel bow, riveted thereto, all substantially as described.

In testimony whereof we have hereunto subscribed our names.

JOHN ABERNETHY.
        WILLIAM H. WHITE.

In presence of—
  WILLIAM COTHREN,
  EDWARD J. HUBBARD.